United States Patent
Inoue (10) Patent No.: US 9,544,086 B2
(45) Date of Patent: Jan. 10, 2017

(54) OPTICAL BRANCHING UNIT AND OPTICAL BRANCHING METHOD

(71) Applicant: NEC Corporation, Tokyo (JP)

(72) Inventor: Takanori Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 14/411,698

(22) PCT Filed: Jun. 28, 2013

(86) PCT No.: PCT/JP2013/004040
§ 371 (c)(1),
(2) Date: Dec. 29, 2014

(87) PCT Pub. No.: WO2014/006861
PCT Pub. Date: Jan. 9, 2014

(65) Prior Publication Data
US 2015/0295674 A1    Oct. 15, 2015

(30) Foreign Application Priority Data

Jul. 2, 2012    (JP) .................................. 2012-148641

(51) Int. Cl.
*H04J 14/02* (2006.01)
*H04B 10/08* (2006.01)
(Continued)

(52) U.S. Cl.
CPC ........... *H04J 14/0215* (2013.01); *H04B 10/03* (2013.01); *H04B 10/079* (2013.01); *H04B 10/27* (2013.01);
(Continued)

(58) Field of Classification Search
CPC ...................... H04J 14/0215; H04J 14/0212
(Continued)

(56) References Cited

U.S. PATENT DOCUMENTS 5,793,746 A * 8/1998 Gerstel ............... H04J 14/0283
370/228
5,867,289 A * 2/1999 Gerstel ............... H04B 10/038
398/12
(Continued)

FOREIGN PATENT DOCUMENTS

CN    1275277 A    11/2000
CN    1379936 A    11/2002
(Continued)

OTHER PUBLICATIONS

Office Action mailed on Aug. 18, 2015 by the Japanese Patent Office in counterpart Japanese Patent Application No. 2014-523586.
(Continued)

*Primary Examiner* — Oommen Jacob
(74) *Attorney, Agent, or Firm* — Finnegan, Henderson, Farabow, Garrett & Dunner LLP (57) ABSTRACT

In order to allow for a flexible network configuration and establish an alternative path without performing communication between optical branching units in the event of a failure on a path in an optical communication system to which a plurality of optical branching units are connected, the optical branching unit includes optical add-drop unit for outputting an input WDM signal to any of a plurality of paths on a per-wavelength basis, light wavelength detecting unit for detecting a wavelength of the input WDM signal, a wavelength database storing, on a per-wavelength basis, information about sections through which optical signals contained in the WDM signal pass, and control unit for changing a setting of the optical add-drop unit so that a path of an optical signal of a wavelength passing through a particular one of the sections bypasses the particular section when all wavelengths stored in the wavelength database are (Continued)

not detected in the particular section by the light wavelength detecting unit.

20 Claims, 5 Drawing Sheets

(51) Int. Cl.
    *H04Q 11/00*         (2006.01)
    *H04B 10/03*         (2013.01)
    *H04B 10/079*      (2013.01)
    *H04B 10/27*         (2013.01)

(52) U.S. Cl.
    CPC ........ *H04J 14/0212* (2013.01); *H04J 14/0227* (2013.01); *H04J 14/0287* (2013.01)

(58) Field of Classification Search
    USPC ............................................. 398/83, 79, 6, 7
    See application file for complete search history.

(56) References Cited

U.S. PATENT DOCUMENTS

| | | | | |
|---|---|---|---|---|
| 6,980,736 B1* | 12/2005 | Fee | ................... | H04Q 11/0005 398/12 |
| 7,099,578 B1* | 8/2006 | Gerstel | ............... | H04J 14/0295 370/216 |
| 7,248,561 B2* | 7/2007 | Ishibashi | ............. | H04J 14/0227 370/228 |
| 7,848,646 B2* | 12/2010 | Fukashiro | ........... | H04J 14/0227 398/12 |
| 8,406,124 B2* | 3/2013 | Long | ....................... | H04L 45/02 370/220 |
| 8,611,740 B2* | 12/2013 | Grossman | ............ | H04B 10/032 398/11 |
| 8,693,880 B2* | 4/2014 | Sakauchi | ............ | H04J 14/0204 385/24 |
| 8,849,109 B2* | 9/2014 | Meyer | ................ | H04B 10/0791 398/10 |
| 8,891,956 B2* | 11/2014 | Wang | ................. | H04J 14/0268 398/22 |
| 2002/0145779 A1* | 10/2002 | Strasser | ............ | G02B 6/29367 398/69 |
| 2002/0176130 A1* | 11/2002 | Maeno | ............... | H04B 10/0791 398/20 |
| 2003/0145246 A1* | 7/2003 | Suemura | ............... | H04L 12/437 714/2 |
| 2004/0105136 A1* | 6/2004 | Feinberg | ............. | H04J 14/0227 359/20 |
| 2006/0210266 A1* | 9/2006 | Aoki | .................. | H04Q 11/0005 398/19 |
| 2007/0189663 A1 | 8/2007 | Hirai et al. | | |
| 2011/0116790 A1 | 5/2011 | Sakauchi et al. | | |
| 2012/0201543 A1* | 8/2012 | Inoue | ................ | H04B 10/0797 398/83 |
| 2015/0295674 A1* | 10/2015 | Inoue | .................... | H04B 10/03 398/83 |

FOREIGN PATENT DOCUMENTS

| | | |
|---|---|---|
| CN | 1815935 A | 8/2006 |
| CN | 201114070 Y | 9/2008 |
| CN | 101325459 A | 12/2008 |
| EP | 0 779 718 A2 | 6/1997 |
| EP | 2 418 787 A1 | 2/2012 |
| JP | 2002-281055 | 9/2002 |
| JP | 2002-353906 | 12/2002 |
| JP | 2003-143171 | 5/2003 |
| JP | 2003-258851 | 9/2003 |
| JP | 2007-208591 | 8/2007 |
| JP | 2011-24189 | 2/2011 |
| WO | WO 2004/010620 A1 | 1/2004 |

OTHER PUBLICATIONS

International Search Report and Written Opinion mailed Sep. 17, 2013 in corresponding PCT International Application.
Extended European Search Report mailed on Feb. 24, 2016, by the European Patent Office in counterpart European Patent Application No. 13812973.9.
Office Action mailed on Apr. 1, 2016, by the Chinese Patent Office in counterpart Chinese Patent Application No. 201380035635.9.
Office Action mailed on Feb. 23, 2016, by the Japanese Patent Office in counterpart Japanese Patent Application No. 2014-523586.

\* cited by examiner

OPTICAL BRANCHING UNIT AND OPTICAL BRANCHING METHOD

CROSS-REFERENCE TO RELATED PATENT APPLICATIONS

This application is a National Stage Entry of International Application No. PCT/JP2013/004040, filed Jun. 28, 2013, which claims priority from Japanese Patent Application No. 2012-148641, filed Jul. 2, 2012. The entire contents of the above-referenced applications are expressly incorporated herein by reference.

TECHNICAL FIELD

The present invention relates to an optical branching unit and an optical branching method and, in particular, to an optical branching unit and an optical branching method that include optical add-drop functionality and are used in wavelength multiplexing communication.

BACKGROUND ART

Optical submarine cable systems are the basis of global networks. Thanks to advances in higher bit rate modulation technology and wavelength multiplexing technology, some optical submarine cable systems achieve traffic capacities greater than 1 terabit per second.

Figure 5:
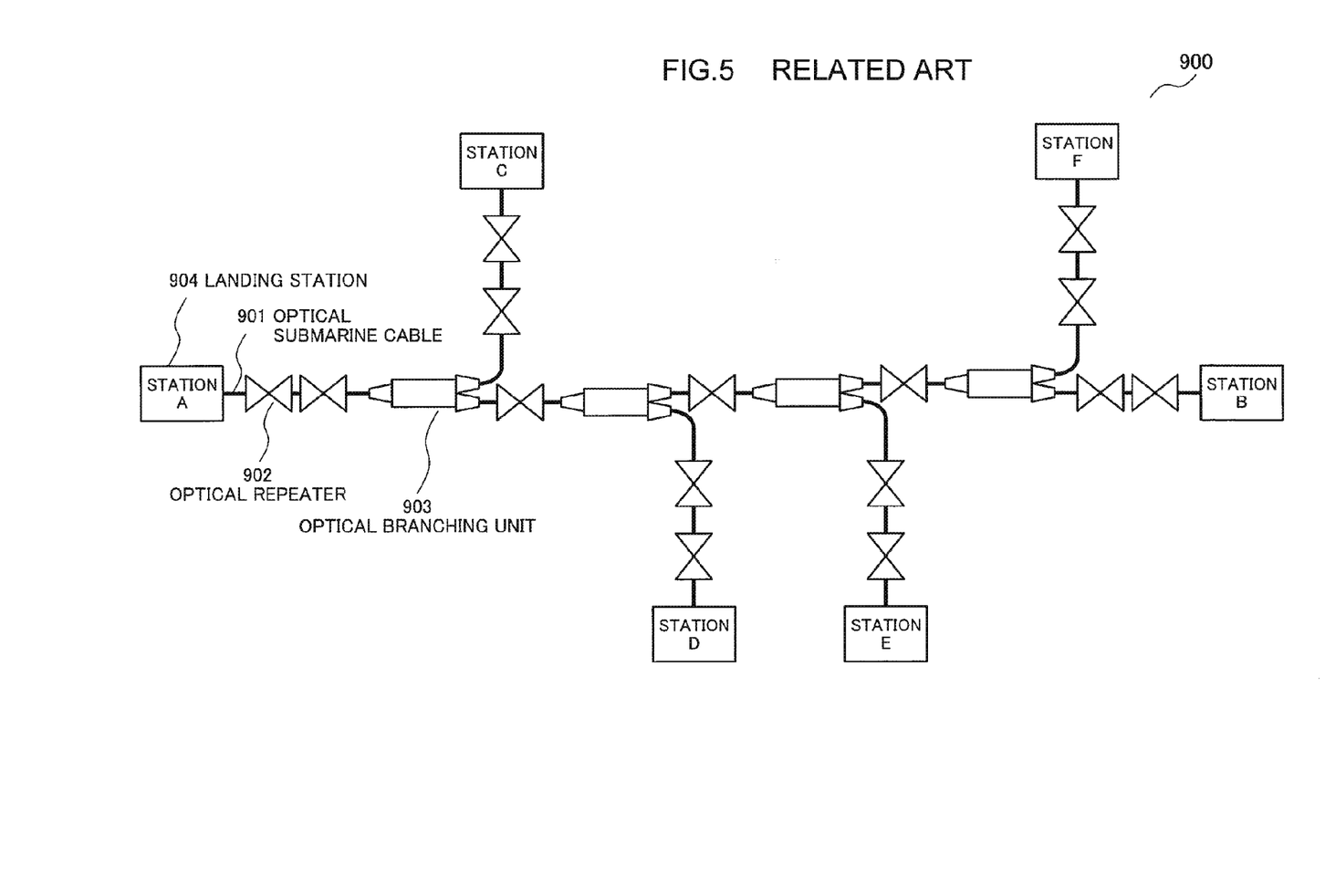

FIG. 5 is a diagram illustrating a conventional configuration of an optical submarine cable system related to the present invention. An optical submarine cable system 900 includes submarine cables 901 containing protected optical fibers, optical submarine repeaters 902 which compensate for attenuation along the optical fibers, optical branching units 903 each of which splits a submarine cable into two, and landing stations (stations A to F) 904 which are installed on land. The optical branching units 903 branch or couple wavelength division multiplexing (WDM) signals input from adjacent landing stations A to F or optical branching units 903. The optical branching units 903 are classified to a "fixed type" which branches or couples pairs of optical fibers while regarding two optical fibers as one pair and an "optical add-drop type" which branches optical signals of different wavelengths in one fiber pair.

Patent Literature 1 discloses a ring network system and a node unit that are used in an optical submarine cable system and include through, add, and drop functions.

CITATION LIST

Patent Literature

[Patent Literature 1] Japanese Laid-open Patent Publication No. 2003-143171

SUMMARY OF INVENTION

Technical Problem

When a cable of an optical submarine cable system is broken due to a disaster such as an earthquake, a huge amount of traffic may be lost and an extremely serious and wide-scale communication failure may occur.

To address this, a configuration for establishing an alternative path that bypasses a failed section in the event of a failure on a transmission path has been proposed. For example, Patent Literature 1 describes an optical submarine cable system in which each of an active transmission path and a backup transmission path makes up a ring network. In the system described in Patent Literature 1, when a failure is detected between nodes of an active transmission path, the path between the nodes is replaced with a backup transmission path. However, a topology of a transmission path in the system described in Patent Literature 1 is limited to the ring network, and therefore there is a problem that flexibility of a network configuration is low. In addition, the system described in Patent Literature 1 uses a monitoring control channel for sending and receiving failure information. Accordingly, the system has another problem that when the monitoring control channel fails, switching from the active transmission path to the backup transmission path may not properly be made.

An object of the present invention is to provide a technique for allowing for a flexible network configuration and establishing an alternative path without performing communication between optical branching units in the event of a failure on a path in an optical communication system to which a plurality of optical branching units are connected.

Solution to Problem

An optical branching unit of the present invention includes optical add-drop means for outputting an input WDM signal to any of a plurality of paths on a per-wavelength basis, light wavelength detecting means for detecting a wavelength of the input WDM signal, wavelength database storing, on a per-wavelength basis, information about sections through which an optical signal contained in the WDM signal passes, and control means for determining that a failure occurs in a particular one of the sections when all wavelengths stored in the wavelength database are not detected in the particular section by the light wavelength detecting means and changing a setting of the optical add-drop means so that a path of an optical signal of a wavelength passing through the particular section bypasses the particular section.

An optical branching method of the present invention includes outputting an input WDM signal to any of a plurality of paths on a per-wavelength basis, detecting a wavelength of the input WDM signal, storing, on a per-wavelength basis, information about sections through which an optical signal contained in the WDM signal passes in a wavelength database, and determining that a failure occurs in a particular one of the sections when all wavelengths stored in the wavelength database are not detected in the particular section by the light wavelength detecting means and changing a setting of the optical add-drop means so that a path of an optical signal of a wavelength passing through the particular section bypasses the particular section.

Advantageous Effects of Invention

The present invention has the advantageous effects of allowing for a flexible network configuration and enabling an alternative path to be established without performing communication between optical branching units in the event of a failure on a path in an optical communication system to which a plurality of optical branching units are connected.

BRIEF DESCRIPTION OF INVENTION

DESCRIPTION OF EXEMPLARY EMBODIMENTS

First Exemplary Embodiment

Figure 1:
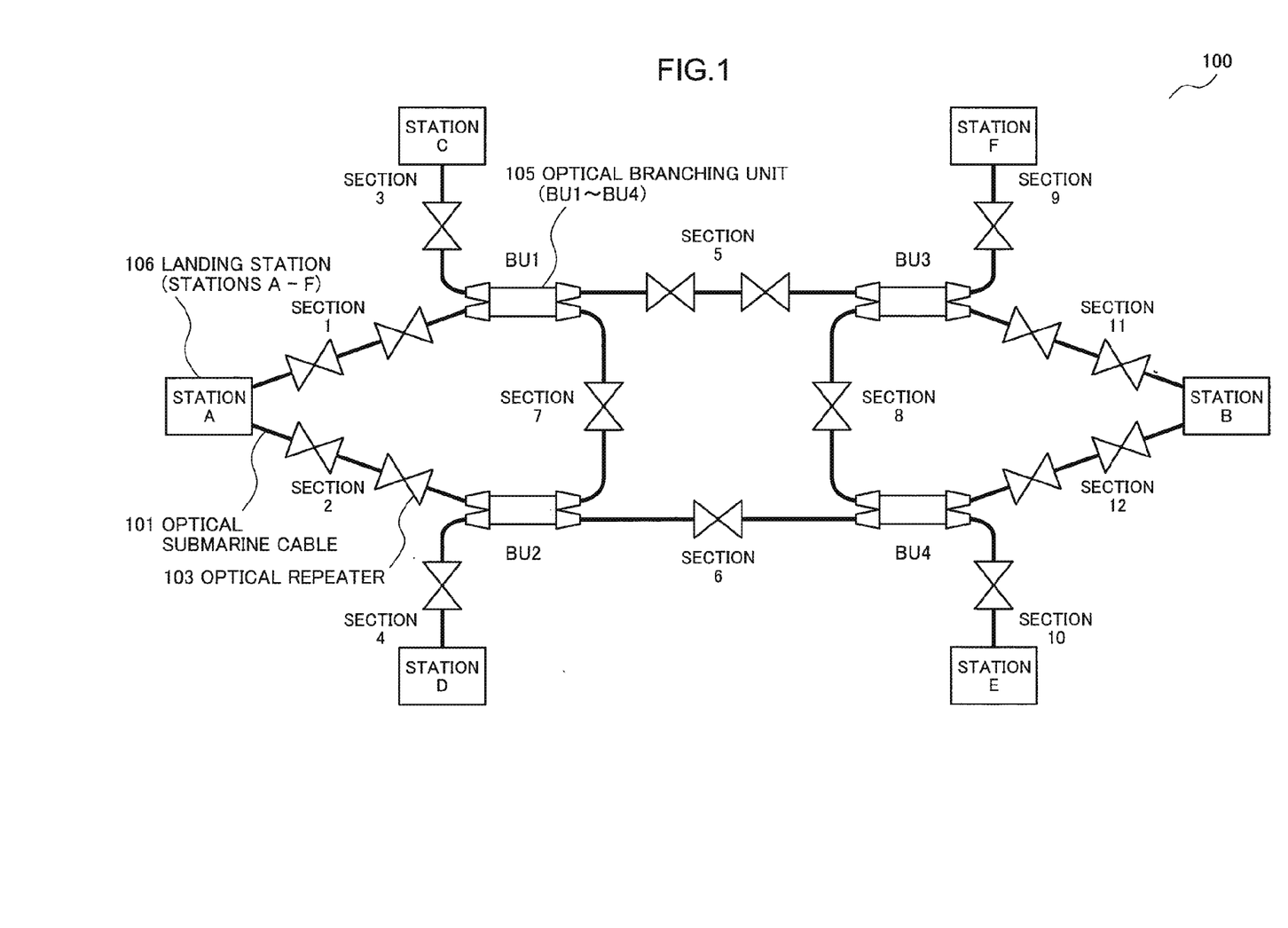
FIG. 1 A diagram illustrating a configuration of an optical submarine cable system according to a first exemplary embodiment FIG. 2 A block diagram illustrating a configuration of an optical branching circuit FIG. 3 A block diagram illustrating a configuration of an optical path failure detector FIG. 4 A block diagram illustrating a configuration of a level-adjustable optical add-drop circuit according to a second exemplary embodiment FIG. 5 A diagram illustrating a conventional configuration of an optical submarine cable system related to the present invention

An optical submarine cable system according to a first exemplary embodiment of the present invention will be described below. FIG. 1 is a diagram illustrating a configuration of an optical submarine cable system 100 according to the first exemplary embodiment of the present invention. In the optical submarine cable system 100 illustrated in FIG. 1, the optical branching units 903 in the optical submarine cable system 900 illustrated in FIG. 5 are replaced with optical branching units 105. The optical branching unit 105 is a branching unit for an optical submarine cable installed on the ocean floor. The optical branching units 105 are connected in a mesh topology through submarine cables 101. The optical branching unit 105 includes four input/output ports, each of which is connected to a landing station 106 (one of stations A to F) or another optical branching unit 105 through an optical submarine cable 101 and an optical repeater 103. Optical signals transmitted through the optical submarine cable 101 are WDM signals.

The landing station 106 is a connection point between the optical submarine cable system 100 and a land-based transmission network. The landing station 106 is installed on land. The landing stations 106 are interconnected by way of at least one optical branching unit 105. By interconnecting the optical branching units 105 in a mesh topology, a plurality of paths can be set between the landing stations 106. Note that the four optical branching units 105 illustrated in FIG. 1 are sometimes referred to as BU (branching unit) 1-4 where necessary in the following description.

The optical branching unit 105 includes optical add-drop functionality capable of selecting a signal of each wavelength out of an input WDM signal and sending out the signal to a branch line. The optical branching unit 105 can branch an optical signal input through a certain port to any of the other three ports and output the signal, using the optical add-drop functionality. The branch destination of the optical branching unit 105 is a landing station 106 or another optical branching unit 105.

Figure 2:
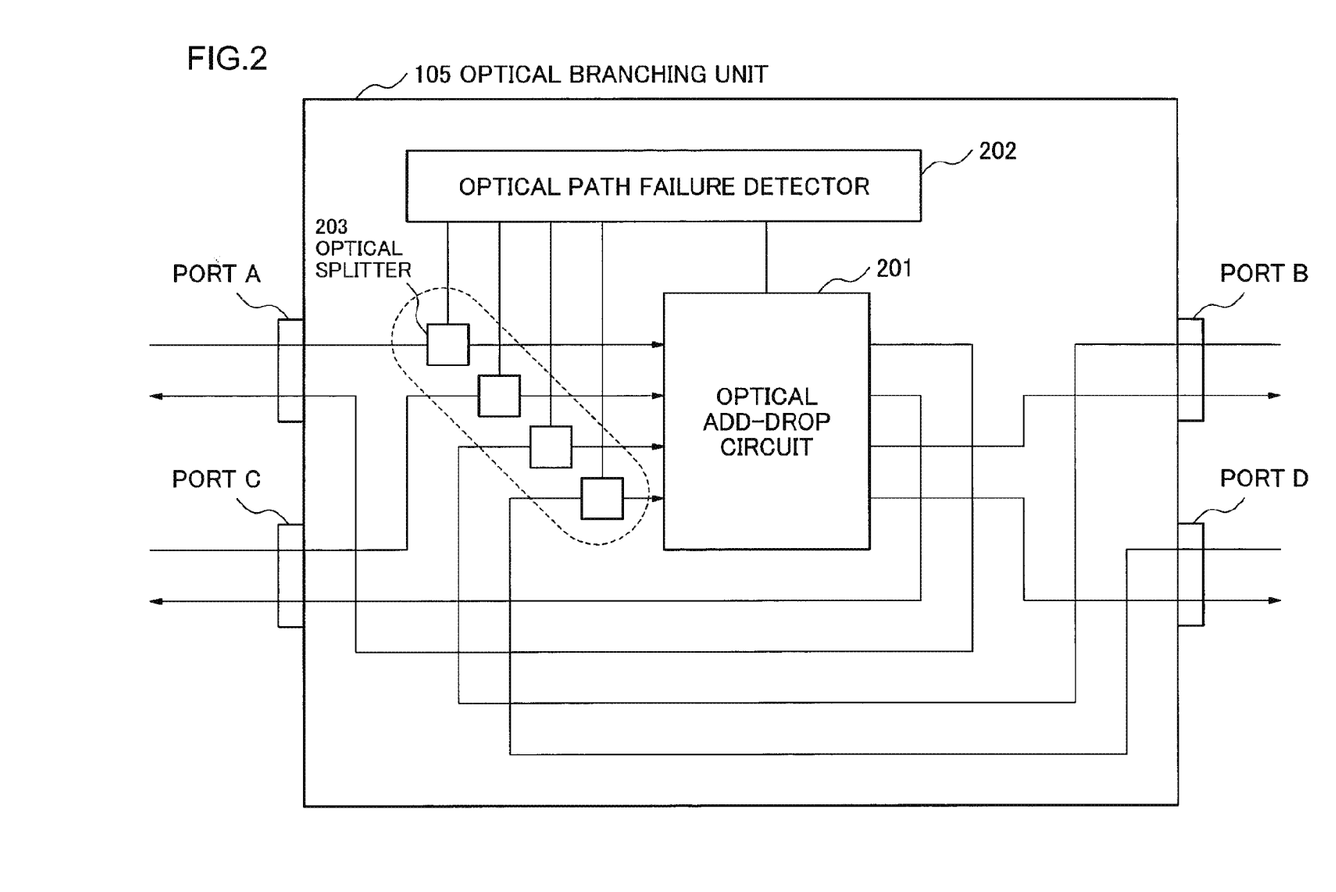

FIG. 2 is a block diagram illustrating a configuration of the optical branching unit 105. The optical branching unit 105 is connected to optical submarine cables 101 in FIG. 1 through four ports (ports A to D) respectively. The optical branching unit 105 includes an optical add-drop circuit 201, an optical path failure detector 202, and optical splitters 203. The optical splitter 203 branches a WDM signal input through each port of the optical branching unit 105 in a certain splitting ratio. The WDM signal divided by the optical splitter 203 is input into the optical path failure detector 202.

The optical add-drop circuit 201 selects a signal of each wavelength out of a WDM signal that is input at each of ports A to D and passes through the optical splitters 203, and outputs the signal to any of the ports. For example, the optical add-drop circuit 201 separates a WDM signal input at port A from the optical submarine cable 101 into optical signals of respective wavelengths and connects optical paths so that each of the optical signals is output to the optical submarine cable 101 through any of ports B to D. Ports A to D do not differ in functionality. The optical add-drop circuit 201 may be a generally known WSS (Wavelength Selective Switch). Note that when the optical submarine cable 101 connected to each port includes a plurality of fiber pairs, an optical add-drop circuit 201 may be provided for each of the fiber pairs.

Figure 3:
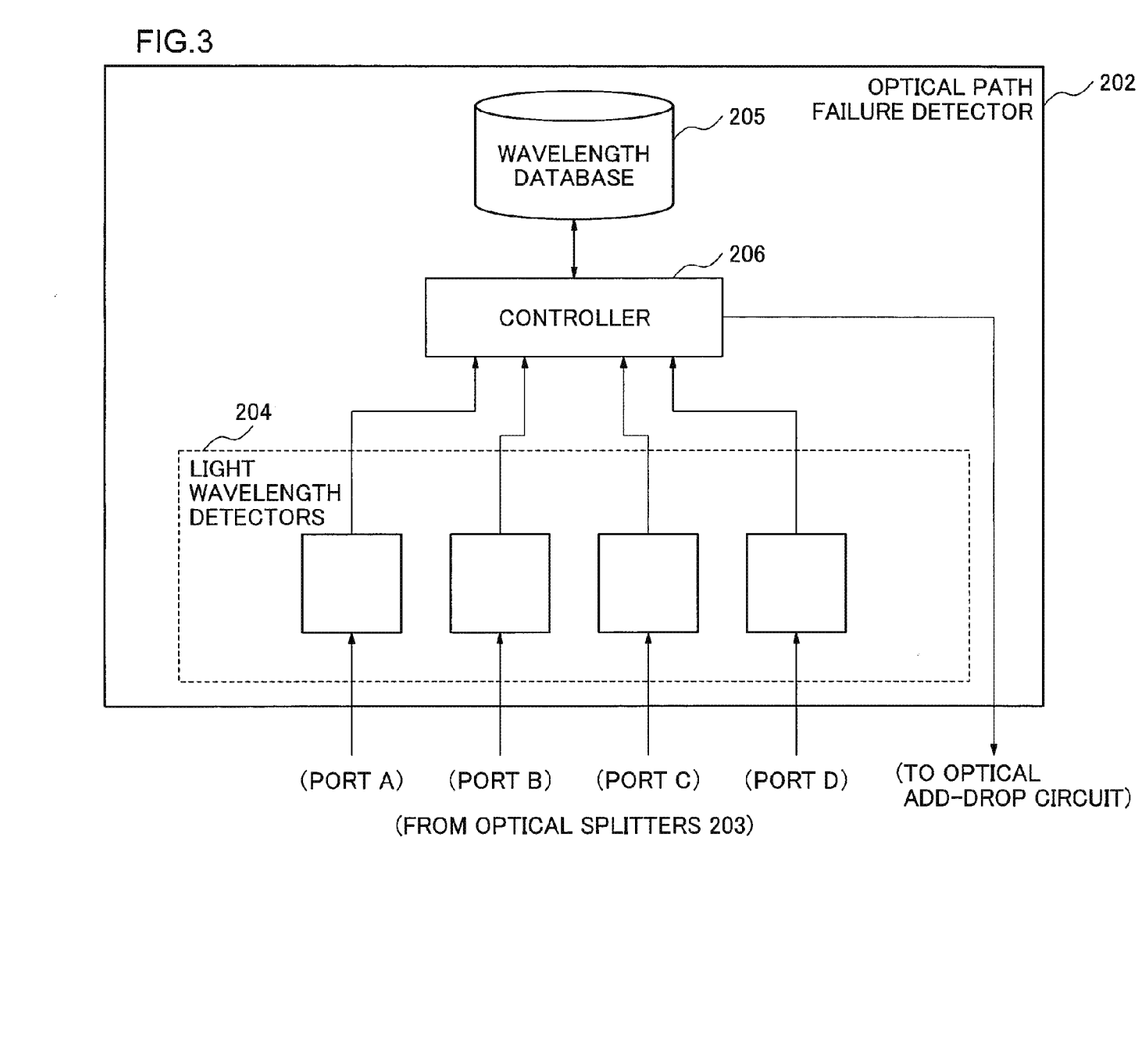

FIG. 3 is a block diagram illustrating a configuration of the optical path failure detector 202. The optical path failure detector 202 includes light wavelength detectors 204, a wavelength database 205, and a controller 206. The optical path failure detector 202 includes a function of identifying a section where a failure occurs and directing the optical add-drop circuit 201 to change a port to which an optical signal is to be sent as necessary. The optical path failure detector 202 receives optical signals that pass through the optical splitters 203 and are input through the respective ports A to D. The light wavelength detectors 204 are individually connected to the paths of the respective input signals. The light wavelength detectors 204 detect wavelengths of input optical signals at respective ports. Since the optical signals input into the light wavelength detectors 204 are WDM signals, the light wavelength detector detects a peak wavelength of each multiplexed optical signal.

An example of the light wavelength detector 204 is an optical spectrum monitor. The optical spectrum monitor is a device capable of detecting wavelengths contained in an input WDM signal and optical power of each of the wavelengths, and includes a diffractive grating and a photodiode array, for example. A typical configuration and a principle of operation of the optical spectrum monitor are well-known, therefore, the detailed description thereof is omitted.

The wavelength database 205 stores information about sections through which optical signals contained in a WDM signal pass on as path information for each wavelength. The path information includes a section between optical branching units through which an optical signal of a specific wavelength passes and information about the optical branching units. The controller 206 controls components of the optical branching unit 105, such as the light wavelength detector 204, the wavelength database 205, and the optical add-drop circuit 201. The controller 206 also processes data output from the light wavelength detector 204 and the wavelength database 205.

Description of Operation of First Exemplary Embodiment

Based on the configuration described above, a specific operation of the optical branching unit 105 in the event of a failure in an optical submarine cable will be described.

In the event of a failure such as a cable break in a section of the optical submarine cable system 100, optical signals of all wavelengths that are passing the section are lost. The term "section" as used herein refers to a section between optical branching units 105 or between an optical branching unit 105 and a landing station 106. The optical path failure detection circuit 202 detects lost wavelengths and identifies a failed section based on path information concerning optical signals of the lost wavelengths. After the failed section is identified, the controller 206 causes the optical add-drop circuit 201 to configure an alternative path that bypasses the failed section. A location to which the optical signal is sent out is automatically changed based on the configured alternative path. An operation of BU1 will be described below as an example.

(1) Each of WDM signals input through respective ports of BU1 is divided by the optical splitter 203 and input into the light wavelength detector 204 provided in the optical path failure detector 202.

(2) Information about wavelengths of optical signals contained in the WDM signal received at each port of BU1 is extracted in the light wavelength detector 204. The light wavelength detector 204 may extract only wavelengths of optical signals that have optical power greater than or equal to a predetermined threshold.

(3) The controller 206 generates a list of wavelengths received at each port based on the extracted wavelength information.

(4) The controller 206 compares wavelengths on the generated list with wavelengths registered in the wavelength database 205 to determine whether or not a wavelength registered in the wavelength database 205 is lost. When there is an optical signal of a wavelength that is not detected by the light wavelength detector 202 in spite of being specified in the wavelength database 205 as a wavelength to be received at the specified optical branching unit (BU1), the controller 206 determines that the optical signal is lost due to a failure.

(5) The controller 206 searches the wavelength database 205 for path information of the optical signal of the wavelength determined being lost and extracts a section where all wavelengths of WDM signals that are to pass therethrough are lost. When a section for which optical signals of all of the wavelengths are lost is found, the controller 206 determines that a failure occurs in the section.

(6) When determining that a failure occurs in a section directly connected to the optical branching unit 105 (BU1), the controller 206 performs the following operation when possible. The controller 206 establishes an alternative path so that optical signals of wavelengths received at the port directly connected to the failed section are received at another normal port and changes a setting of the optical add-drop circuit 201. An alternative path may be established that entails a change of a setting of the optical add-drop circuit of another optical branching unit 105 such as BU2, depending on establishment of the path. When such an alternative path is established, information about the alternative path established for the failed section is also stored in another optical branching unit 105 such as BU2. Each optical branching unit 105 detects the failed section according to the procedure in (4) described above and changes a setting of the optical add-drop circuit 201 when needed for establishing the alternative path for the detected failed section.

Note that the controller 206 may include a function of directing an optical add-drop circuit of another optical branching unit to change the setting based on a stored alternative setting of the optical add-drop circuit. Provision of such a function allows an alternative path to be forcibly established for another optical branching unit.

(7) Path information in the wavelength database 205 of BU1 is updated based on the new setting of the optical add-drop circuit. A condition for switching back to the original path before the update may be stored in the wavelength database. For example, when at the port determined being disconnected all of the lost wavelengths are able to be received, the optical path failure detectors 202 of BU1 and BU2 may restore the settings of the optical add-drop circuits 201 to the state before the update.

A situation in which a section 1 in FIG. 1 is broken is considered as a specific example. In this situation, all wavelengths contained in an optical signal passing through the section 1 are lost at BU1 among the optical branching units 105. However, wavelengths input through the other sections 3, 5, and 7 are not lost. Accordingly, it is determined that a failure occurs in the section 1, and settings of the optical add-drop circuits 201 of BU1 and BU2 are changed so that optical signals that would otherwise pass through the section 1 pass through sections 2 and 7, for example. A landing station A changes a setting so that all inputs and outputs are performed with the section 2. Settings of alternative paths for failed sections are stored in the respective optical branching units 105 and the respective landing stations 106 during construction of the optical submarine cable system 100 beforehand. By storing information about alternative paths for failed sections in each optical branching unit 105, the respective optical branching units 105 can autonomously establish an alternative path without needing communication between optical branching units 105.

In BU2, wavelengths received from the section 7 are compared with wavelengths stored in the wavelength database of BU2. When a failure occurs in the section 1, all signals of wavelengths designated to pass through the section 1 among signals received from the section 7 are lost. Accordingly, BU2 determines that a failure occurs in the section 1. Consequently, BU1 and BU2 detect the failure in the section 1 and therefore establish an alternative path that is to be established when the section 1 fails. Then, a setting of the optical add-drop circuit of BU2 is changed in order to allow signals bypassing the section 1 to travel to BU1.

In BU3, signals that pass through section 1—BU1—section 5 are lost. However, signals that pass through section 3—BU1—section 5 are not lost. Therefore, the section 5 is determined to be normal. For a similar reason, sections 8, 9, and 11 are determined to be normal. When signals are detoured to section 2—BU2—section 7 due to a failure in the section 1, a setting of the optical add-drop circuit of BU3 is not affected by the detour, and therefore the setting at BU 3 is not changed. A setting of the optical add-drop circuit of BU4 is not changed as in BU3.

Another example in which the section 5 in FIG. 1 fails is considered. Since WDM signals input through the section 5 are lost at BU1 and BU3, it is determined that a failure occurs in the section 5. Consequently, settings of the optical add-drop circuits of all of the optical branching units (BU1 to BU4) are changed so that WDM signals that would otherwise be sent out to the section 5 are detoured to section 7—BU2—section 6—BU4—section 8.

In BU1 and BU3, settings of the optical add-drop circuits 201 are changed so that the WDM signals sent out to the section 5 is sent out to the sections 7 and 8. Since optical signals of wavelengths that pass through section 5—BU1—section 7 or section 5—BU3—section 8 are lost at BU2 and BU4, it is determined that a failure occurs in the section 5. Then settings of the optical add-drop circuits 201 are changed so that optical signals that are detoured from BU1 and BU3 pass through the section 6.

In this way, when the optical branching unit 105 in the optical submarine cable system 100 of the first exemplary embodiment detects an optical signal loss, the optical branching unit 105 changes a setting of the optical add-drop circuit 201 so that a section in which the optical signal is lost is bypassed. There is no restriction on a network topology of the optical submarine cable system 100; for example the network topology does not need to be loop, provided that an alternative path can be established for a section to be bypassed. Each optical branching unit 105 can autonomously establish an alternative path even when the optical branching unit 105 cannot communicate with another optical branching unit 105. Furthermore, it will be obvious that the configuration of the optical submarine cable system 100 of the first exemplary embodiment is applicable to an ordinary land-based optical communication system as well.

The optical branching unit 105 described in the first exemplary embodiment has the advantageous effects that a flexible network configuration is allowed and an alternative path can be established without communication between optical branching units in the event of a failure occurring on a path, in an optical communication system.

Minimal Configuration of First Exemplary Embodiment

The optical branching unit 105 described above may have the following minimal configuration. Specifically, an optical branching unit having a minimal configuration includes optical add-drop means, a wavelength database, light wavelength detection means, and control means. The optical add-drop means outputs a signal of each wavelength in an input WDM signal to any one of a plurality of paths. The light wavelength detection means detects wavelengths of an input WDM signal. The light wavelength detection means in the optical branching unit having the minimal configuration includes functions of the optical splitter 203 in FIG. 2 and the light wavelength detector 204 in FIG. 3.

The wavelength database stores path information of optical signals contained in a WDM signal on a per-wavelength basis. The control means determines that a failure occurs in a particular section when all wavelengths stored in the wavelength database for the particular section are not detected by the light wavelength detection means. The control means then changes a setting of the optical add-drop means so that paths of optical signals of wavelengths that would pass through the particular section bypass the particular section.

The optical branching unit having the minimal configuration described above detects wavelengths of an input WDM signal with the light wavelength detection means. Then, when there is a particular section where all wavelengths stored in the wavelength database for the particular section are not detected, the control means determines that a failure occurs in the section. Furthermore, the control means changes a setting of the optical add-drop means so that paths of optical signals of wavelengths that would pass through the failed section (the particular section) bypass the particular section. During the operation of the optical branching units having the minimal configuration described above, communication between the optical branching units is not required.

The optical branching unit having the minimal configuration described above also has the advantageous effects that a flexible network configuration is allowed and an alternative path can be established without communication between optical branching units in the event of a failure occurring on a path.

First Variation of First Exemplary Embodiment

When an optical signal needs to be detoured due to a failure, a wavelength of the optical signal to be detoured may be already used in a path to which the optical signal is to be detoured. In such a situation, the controller 206 may compare priorities of optical signals of the same wavelength with each other and make a setting of the optical add-drop circuit so that the optical signal with a higher priority is transmitted. The priority information may be stored in the wavelength database beforehand in association with wavelengths and paths. When changing the setting of the optical add-drop circuit, the controller 206 may retrieve the priority information and may set the optical add-drop circuit so that the optical signal having a higher priority is transmitted in the event of a failure.

Second Variation of First Exemplary Embodiment

Optical repeaters that are used in an optical submarine cable system are controlled in many cases so that an output power of a WDM signal is kept nearly constant. In such a situation, when optical signals of some wavelengths are lost, the power of optical signals of the remaining wavelengths increases. As the signal power of an optical wavelength increases, influence of non-linear effects increases and accordingly transmission performance may degrade.

To avoid such degradation of transmission performance, the optical branching unit 105 described in the first exemplary embodiment may further include an arrangement that inserts a signal of the same wavelength that is lost through another port. For example, when an optical signal is lost at the port A, the optical branching unit 105 may cause the WDM signal to branch from any of ports B to D by using an optical splitter. The optical branching unit 105 may further include an arrangement that extracts an optical signal of the lost wavelength from the branched WDM signal by using an optical band-pass filter and inserts the optical signal into the light path of the port A of the optical add-drop circuit. As a result, a decrease in the number of wavelengths of the WDM signal at a location to which the signal input through the port A is output can be prevented, and therefore an increase of power of respective wavelengths of the WDM signal after passing through an optical repeater can be suppressed.

Figure 4:
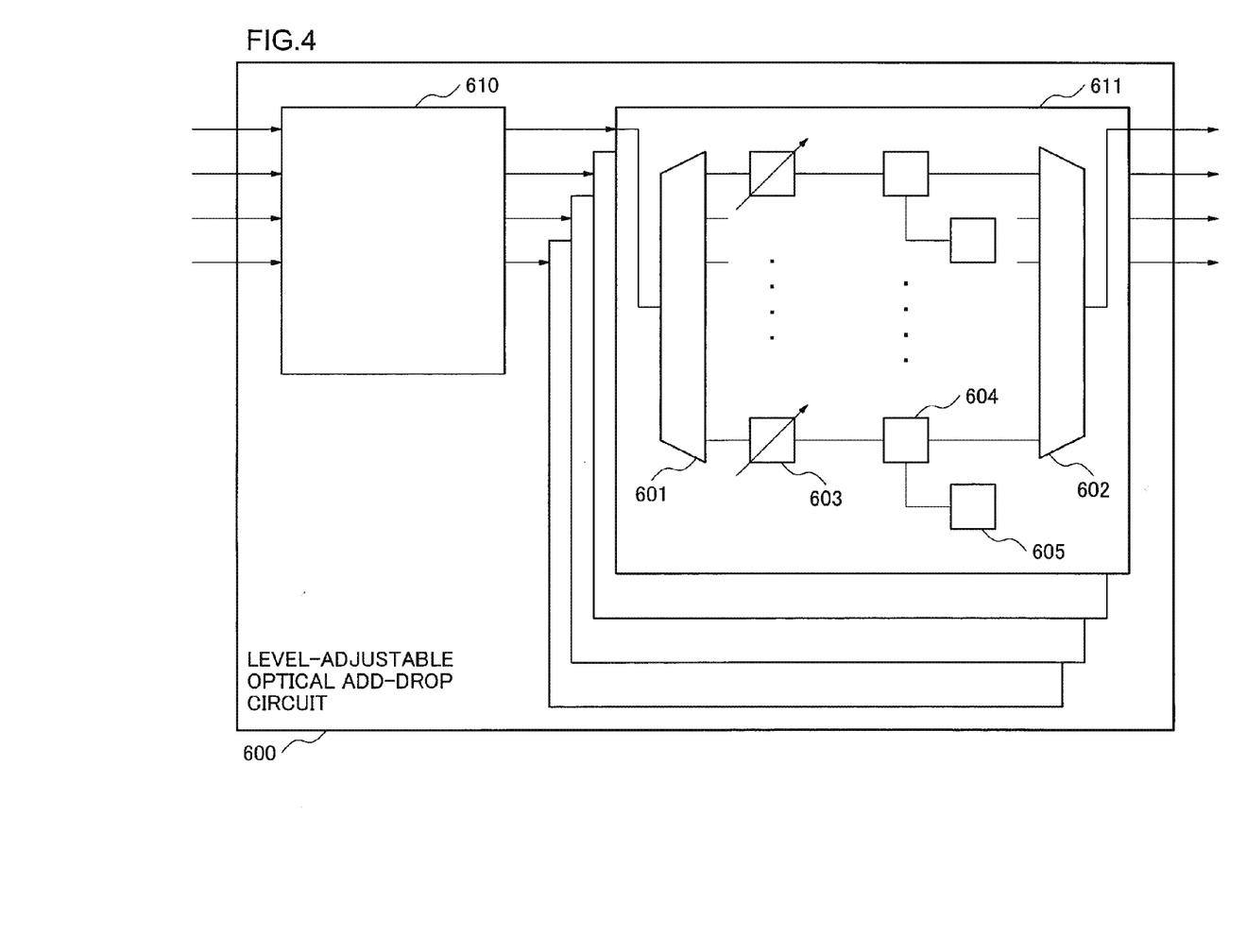

Note that variations in optical power may occur among different wavelengths at the outputs of the optical add-drop circuit 201 due to insertion of an optical signal from another port. In such a case, a level-adjustable optical add-drop circuit 600, which will be described in the following second exemplary embodiment, may be used to suppress variations in power of optical signals among different wavelengths.

Second Exemplary Embodiment

In the optical add-drop circuit 201 described in the first exemplary embodiment, signals from different paths are multiplexed. Differences in optical power among optical signals of different wavelengths result in variations in signal to noise ratio after multiplexing among respective optical signals, which results in differences in transmission performance among respective wavelengths.

In order to prevent differences in transmission performance among respective wavelengths, the optical add-drop circuit 201 may further include a function of allowing adjustment of levels of respective wavelengths. FIG. 4 is a block diagram illustrating a configuration of a level-adjustable optical add-drop circuit 600 according to the second exemplary embodiment of the present invention. The level-adjustable optical add-drop circuit 600 includes an optical add-drop circuit 610 and a variable optical attenuator unit 611. The variable optical attenuator unit 611 includes AWGs (arrayed waveguide gratings) 601 and 602, variable optical attenuators 603, optical splitters 604, and optical monitors 605. One variable optical attenuator unit 611 is provided for each output port. The optical add-drop circuit 610 has a configuration similar to that of the optical add-drop circuit 201 described with reference to FIG. 2. The level-adjustable optical add-drop circuit 600 can replace the optical add-drop circuit 201 in the optical branching unit 105 described with reference to FIG. 2.

A WDM signal output from the optical add-drop circuit 610 is input into the AWG 601. The AWG 601 then separates the input WDM signal into signals of different wavelengths. The variable optical attenuator 603 attenuates the separated optical signal from the AWG 601 by an amount of attenuation that varies in each wavelength under an external control. The optical splitter 604 divides each optical signal in a certain splitting ratio. The optical monitor 605 outputs an electrical signal that is proportional to the intensity of an optical signal branched by the optical splitter 604. The AWG 602 wavelength-multiplexes optical signals that pass through the optical splitters, and outputs a resulting signal through a predetermined port of the optical branching unit 105.

The level-adjustable optical add-drop circuit 600 having the configuration described above allows monitoring the intensity of each optical signal attenuated by the variable optical attenuator 603 as the intensity of an electrical signal output from the optical monitor 605. Accordingly, the level-adjustable optical add-drop circuit 600 is capable of suppressing variations in power of output optical signals among different wavelengths by adjusting a value set for the variable optical attenuators 603.

The level-adjustable optical add-drop circuit 600 of the second exemplary embodiment having the configuration described above may be used in place of the optical add-drop circuit 201 of the optical branching unit 105 of the first exemplary embodiment. An optical branching unit 105 of the first exemplary embodiment that includes the level-adjustable optical add-drop circuit 600 has the advantageous effect of suppressing variations in power of output optical signals of different wavelengths, in addition to the advantageous effects described with respect to the first exemplary embodiment.

Note that the variable optical attenuators 603, the optical splitters 604, and the optical monitors 605 may be disposed on optical paths for respective wavelengths inside the optical add-drop circuit 610. Disposing the variable optical attenuators 603, the optical splitters 604, and the optical monitors 605 inside the optical add-drop circuit 610 eliminates need for AWGs 601 and 602. Consequently the cost of the optical branching units can be reduced.

While the present invention has been described with respect to exemplary embodiments thereof, the present invention is not limited to the exemplary embodiments described above. Various modifications that are apparent to those skilled in the art can be made to the configurations and details of the present invention within the scope of the present invention. For example, the numbers and arrangements of the optical branching units 105 and the landing stations 106 are not limited to those illustrated in FIG. 1.

This application is based upon and claims the benefit of priority from Japanese Patent Application No 2012-148641, filed on Jul. 2, 2012, the entire contents of the disclosure are incorporated herein.

REFERENCE SIGNS LIST 100, 900 . . . Optical submarine cable system
101, 901 . . . Optical submarine cable
103, 902 . . . Optical repeater
105, 903 . . . Optical branching unit
106, 904 . . . Landing station
201, 610 . . . Optical add-drop circuit
202 . . . Optical path failure detector
203 . . . Optical splitter
204 . . . Light wavelength detector
205 . . . Wavelength database
206 . . . Controller
600 . . . Level-adjustable optical add-drop circuit
601, 602 . . . AWG
603 . . . Variable optical attenuator
604 . . . Optical splitter
605 . . . Optical monitor
611 . . . Variable optical attenuator unit

The invention claimed is:

1. An optical branching device comprising:
   an optical add-drop circuit that outputs a first input wavelength division multiplexing (WDM) signal to any of a plurality of paths on a per-wavelength basis;
   a light wavelength detector that detects a wavelength of the first WDM signal;
   a wavelength database storing, on a per-wavelength basis, information about one or more sections through which an optical signal contained in the first WDM signal passes, the sections being external to the optical branching device and coupled with the optical branching device; and
   a controller configured to change a setting of the optical add-drop circuit so that a path of an optical signal of a wavelength passing through a particular one of the sections bypasses the particular section when every wavelength stored in the wavelength database for the particular section is not detected in the particular section by the light wavelength detector.

2. The optical branching device according to claim 1, wherein the controller is further configured to:
   store an alternative setting of the optical add-drop circuit for bypassing the particular section, the alternative setting being in association with a location of the particular section; and
   change a setting of the optical add-drop circuit based on the stored alternative setting of the optical add-drop circuit.

3. The optical branching device according to claim 2, wherein the alternative setting of the optical add-drop circuit for bypassing the particular section is stored in association with a location of the particular section, and controller is further configured to, based on the stored alternative setting of the optical add-drop circuit, direct an optical add-drop circuit of another optical branching device to change a setting.

4. The optical branching device according to claim 1, wherein the optical add-drop circuit further comprises a variable optical attenuator configured to adjust a level of the optical signal of each wavelength.

5. The optical branching device according to claim 1, wherein, when a first optical signal of a second WDM signal is lost in the particular section, the optical add-drop circuit couples the second WDM signal with a second optical signal of a wavelength of the first optical signal, the second optical signal being separated from a third WDM signal received through a path that does not include the particular section.

6. An optical communication system, comprising:
   a plurality of the optical branching devices according to claim 1, wherein the plurality of optical branching devices are interconnected so that a plurality of paths of the first WDM signal exist between the plurality of optical branching devices.

7. An optical submarine cable system, comprising:
the optical communication system according to claim 6 installed on an ocean floor; and
a land-based landing station connected to the optical communication system.

8. An optical branching method comprising:
outputting a first input WDM signal to any of a plurality of paths on a per-wavelength basis;
detecting a wavelength of the first WDM signal;
storing, in a wavelength database, on a per-wavelength basis, information about one or more sections through which an optical signal contained in the WDM signal passes, the sections being external to an optical branching device and coupled with the optical branching device; and
changing a setting of a path of an optical signal of a wavelength passing through a particular one of the sections so that the path bypasses the particular section when every wavelength stored in the wavelength database for the particular section is not detected in the particular section.

9. An optical branching device comprising:
optical add-drop means for outputting an input WDM signal to any of a plurality of paths on a per-wavelength basis;
light wavelength detecting means for detecting a wavelength of the input WDM signal;
a wavelength database storing, on a per-wavelength basis, information about one or more sections through which an optical signal contained in the WDM signal passes, the sections being external to the optical branching device and coupled with the optical branching device; and
control means for changing a setting of the optical add-drop means so that a path of an optical signal of a wavelength passing through a particular one of the sections bypasses the particular section when every wavelength stored in the wavelength database for the particular section is not detected in the particular section by the light wavelength detecting means.

10. The optical communication system according to claim 6, wherein the controller in each of the optical branching devices is further configured to:
store an alternative setting of the respective optical add-drop circuit for bypassing the particular section, the alternative setting being in association with a location of the particular section; and
change a setting of the respective optical add-drop circuit based on the stored alternative setting of the respective optical add-drop circuit.

11. The optical communication system according to claim 10, wherein the alternative setting of the respective optical add-drop circuit for bypassing the particular section is stored in association with a location of the particular section, and each controller is further configured to, based on the stored alternative setting of the respective optical add-drop circuit, direct an optical add-drop circuit of another optical branching device to change a setting.

12. The optical communication system according to claim 6, wherein the optical add-drop circuit in each of the optical branching devices further comprises a variable optical attenuator configured to adjust a level of the optical signal of each wavelength.

13. The optical communication system according to claim 6, wherein, when a first optical signal of a second WDM signal is lost in the particular section, the optical add-drop circuit in each of the optical branching devices couples the second WDM signal with a second optical signal of a wavelength of the first optical signal, the second optical signal being separated from a third WDM signal received through a path that does not include the particular section.

14. The optical branching method according to claim 8, wherein changing the setting of the path of the optical signal further comprises:
storing an alternative setting for bypassing the particular section, the alternative setting being in association with a location of the particular section; and
changing the setting based on the stored alternative setting.

15. The optical branching method according to claim 14, wherein:
the alternative setting for bypassing the particular section is stored in association with a location of the particular section; and
the method further comprises:
based on the stored alternative setting of the optical add-drop circuit, directing an optical add-drop circuit of another optical branching device to change a setting.

16. The optical branching method according to claim 8, wherein outputting the first input WDM signal further comprises:
adjusting a level of the optical signal of each wavelength.

17. The optical branching method according to claim 8, further comprising:
when a first optical signal of a second WDM signal is lost in the particular section, coupling the second WDM signal with a second optical signal of a wavelength of the first optical signal, the second optical signal being separated from a third WDM signal received through a path that does not include the particular section.

18. The optical branching device according to claim 9, wherein the control means is further configured to:
store an alternative setting of the optical add-drop means for bypassing the particular section, the alternative setting being in association with a location of the particular section; and
change a setting of the optical add-drop means based on the stored alternative setting of the optical add-drop means.

19. The optical branching device according to claim 18, wherein the alternative setting of the optical add-drop means for bypassing the particular section is stored in association with a location of the particular section, and control means is further configured to, based on the stored alternative setting of the optical add-drop means, direct an optical add-drop means of another optical branching device to change a setting.

20. The optical branching device according to claim 9, wherein the optical add-drop means further comprises variable optical attenuating means for adjusting a level of the optical signal of each wavelength.

* * * * *